(12) United States Patent
Moon et al.

(10) Patent No.: US 11,579,076 B2
(45) Date of Patent: Feb. 14, 2023

(54) METHOD AND APPARATUS FOR CORRECTING ERROR OF OPTICAL SENSOR, APPARATUS FOR ESTIMATING BIO-INFORMATION

(71) Applicant: SAMSUNG ELECTRONICS CO., LTD., Suwon-si (KR)

(72) Inventors: Hyun Seok Moon, Hwaseong-si (KR); Sang Kyu Kim, Yongin-si (KR); Yoon Jae Kim, Seoul (KR); Jin Young Park, Hwaseong-si (KR); Sung Mo Ahn, Yongin-si (KR); Kun Sun Eom, Yongin-si (KR); Myoung Hoon Jung, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/217,307

(22) Filed: Mar. 30, 2021

(65) Prior Publication Data
US 2022/0099565 A1  Mar. 31, 2022

(30) Foreign Application Priority Data
Sep. 25, 2020  (KR) .......................... 10-2020-0124753

(51) Int. Cl.
*G01N 21/27* (2006.01)
*G01N 21/31* (2006.01)
*G01N 21/17* (2006.01)

(52) U.S. Cl.
CPC ........... *G01N 21/274* (2013.01); *G01N 21/31* (2013.01); *G01N 2021/1765* (2013.01)

(58) Field of Classification Search
CPC ................. G01N 21/274; G01N 21/31; G01N 2021/1765
USPC ...................................................... 356/243.1
See application file for complete search history.

(56) References Cited

U.S. PATENT DOCUMENTS

| 5,598,182 | A | * | 1/1997 | Berend | ................. | G06T 11/001 |
| | | | | | | 345/441 |
| 6,049,727 | A | | 4/2000 | Crothall | | |
| 7,705,313 | B1 | | 4/2010 | Russell | | |
| 9,279,746 | B2 | | 3/2016 | Wynn | | |
| 9,763,558 | B2 | | 9/2017 | Kobayashi et al. | | |
| 10,578,547 | B2 | | 3/2020 | Green et al. | | |
| 10,609,349 | B2 | | 3/2020 | Furuya | | |
| 2002/0105627 | A1 | * | 8/2002 | Matsuyama | ............ | G03F 7/706 |
| | | | | | | 250/548 |
| 2008/0212436 | A1 | | 9/2008 | Zijp et al. | | |

(Continued)

FOREIGN PATENT DOCUMENTS

| CN | 1584918 A | * | 2/2005 |
| CN | 103267728 A | | 8/2013 |

(Continued)

*Primary Examiner* — Tarifur R Chowdhury
*Assistant Examiner* — Omar H Nixon
(74) *Attorney, Agent, or Firm* — Sughrue Mion, PLLC

(57) ABSTRACT

Provided is a method of correcting an error of an optical sensor including a light source and an image sensor, the method including emitting light to a material by driving the light source, acquiring an image of the material by the image sensor, and correcting an error of a distance between the light source and the image sensor of the optical sensor based on a gradation of the acquired image of the material.

18 Claims, 15 Drawing Sheets

(56) References Cited

U.S. PATENT DOCUMENTS

2009/0244329 A1\* 10/2009 Kuniba ................ H04N 5/2351
                                                    348/241
2010/0045766 A1    2/2010 Imai et al.

FOREIGN PATENT DOCUMENTS

| | | |
|---|---|---|
| JP | 2010-271046 A | 12/2010 |
| JP | 2015-8785 A | 1/2015 |
| JP | 2016-102890 A | 6/2016 |
| JP | 2016-142672 A | 8/2016 |
| JP | 2018-155801 A | 10/2018 |
| KR | 10-2008-0032149 A | 4/2008 |
| KR | 10-1607842 B1 | 3/2016 |
| KR | 10-2017-0012658 A | 2/2017 |
| KR | 10-2018-0072584 A | 6/2018 |
| KR | 10-2020-0050835 A | 5/2020 |

\* cited by examiner

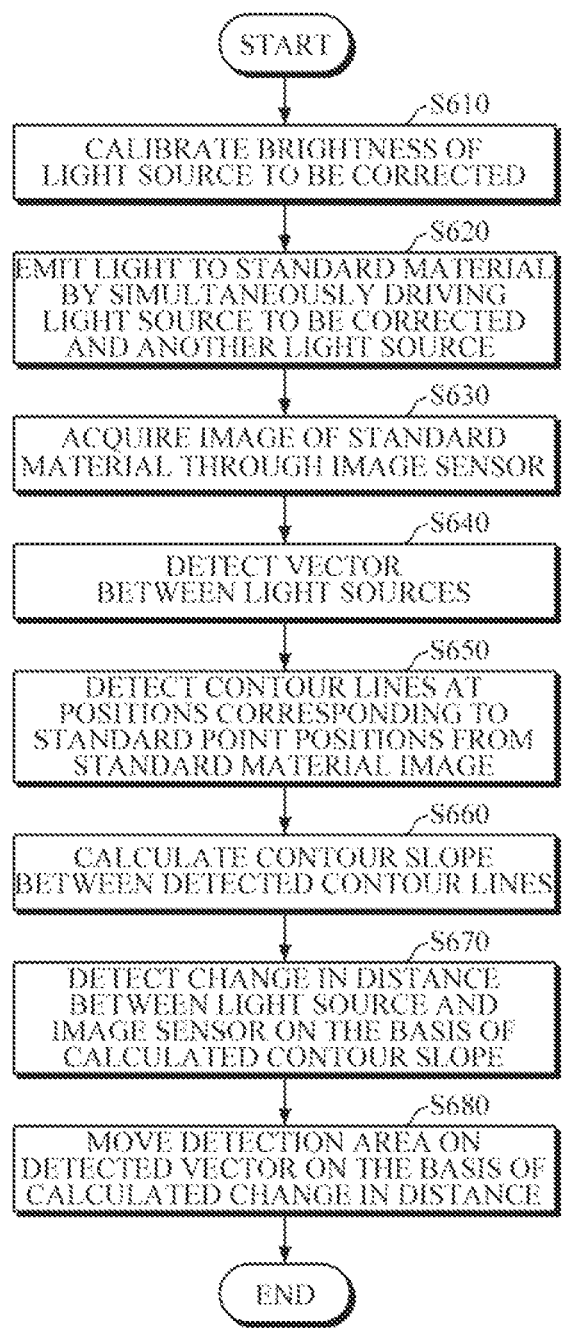

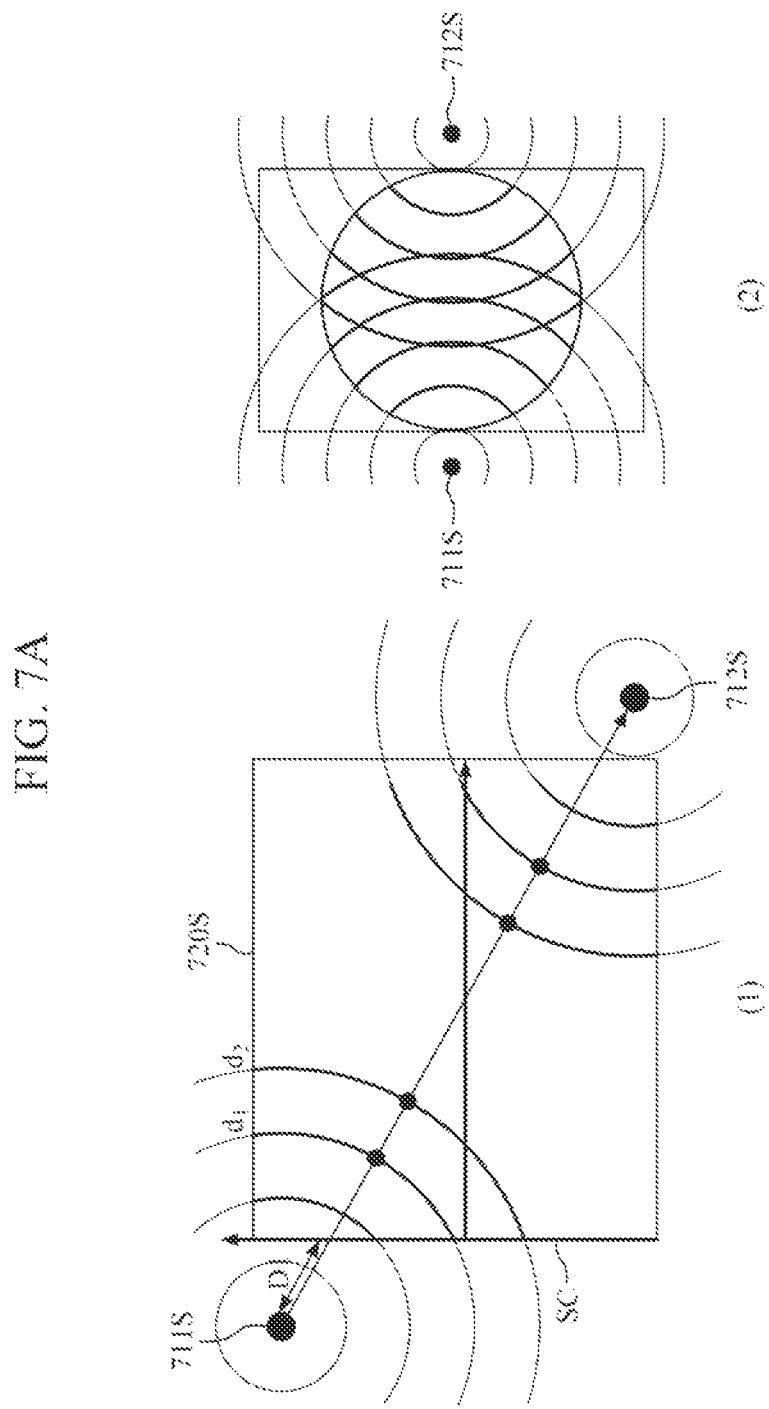

METHOD AND APPARATUS FOR CORRECTING ERROR OF OPTICAL SENSOR, APPARATUS FOR ESTIMATING BIO-INFORMATION

CROSS-REFERENCE TO RELATED APPLICATION(S)

This application claims priority to Korean Patent Application No. 10-2020-0124753, filed on Sep. 25, 2020 in the Korean Intellectual Property Office, the disclosure of which is incorporated by reference herein in its entirety.

BACKGROUND

1. Field

Example embodiments of the present disclosure relate to a technology for correcting an error of an optical sensor, and more particularly, to a technology for correcting an error of distance between a light source of an optical sensor and a detector.

2. Description of Related Art

Recently, technology for non-invasively estimating various types of bio-information using an optical sensor has been developed. In general, a spectrum may be measured from a sample to be analyzed through an optical sensor and bio-information including antioxidant indicators may be estimated using absorbance of the measured spectrum. An optical sensor is precisely designed to have a constant distance between a light source and a detector. When a distance between the optical sensor and the detector has an error of 0.1 mm, the absorbance may change by about 5%. As described above, in a case where there is a distance deviation between a light source and a detector for each device equipped with an optical sensor, the accuracy of an estimated bio-information value may be different from one device to another.

SUMMARY

One or more example embodiments provide a technology for correcting an error of an optical sensor, and more particularly, to a technology for correcting an error of distance between a light source of an optical sensor and a detector.

Additional aspects will be set forth in part in the description which follows and, in part, will be apparent from the description, or may be learned by practice of the example embodiments.

According to an aspect of an example embodiment, there is provided a method of correcting an error of an optical sensor including a light source and an image sensor, the method including emitting light to a material by driving the light source, acquiring an image of the material by the image sensor, and correcting an error of a distance between the light source and the image sensor of the optical sensor based on a gradation of the acquired image of the material.

The emitting of the light may include adjusting a brightness of the light emitted by the light source to correspond to a preset brightness prior to emitting the light from the light source.

The correcting of the error may include detecting a change in the distance between the light source and the image sensor from a preset distance based on the gradation of the image of the material, and correcting the error of the distance between the light source and the image sensor based on the detected change in the distance.

The correcting of the error may include obtaining a slope between preset points based on an intensity of light detected by the image sensor, and detecting the change in the distance between the light source and the image sensor based on the obtained slope and a preset slope.

The correcting of the error may include obtaining a first slope between X-coordinate points of the preset points of the image sensor and a second slope between Y-coordinate points of the preset points of the image sensor, and detecting the change in the distance between the light source and the image sensor based on the obtained first slope and the obtained second slope.

The correcting of the error may include resetting coordinates of a detection area of the image sensor with respect to the light source based on the detected change in the distance between the light source and the image sensor.

The emitting of the light may include driving another light source configured to emit light of a same wavelength as the light source, and the correcting of the error may further include detecting contour lines at positions corresponding to preset contour points from the image of the material, obtaining a contour slope between the detected contour lines, and detecting the change in the distance between the light source and the image sensor based on the obtained contour slope and a preset contour slope.

The correcting of the error may further include detecting a vector between the light source and the another light source, and moving coordinates of a detection area of the image sensor with respect to the light source on the detected vector based on the change in the distance between the light source and the image sensor.

The method may further include displaying a detection area of the image sensor prior to error correction of the light source and a detection area of an error-corrected image sensor.

According to another aspect of an example embodiment, there is provided an apparatus configured to correct an error of an optical sensor including a light source and an image sensor, the apparatus including a processor configured to drive the light source to emit light to a material, and correct an error of a distance between the light source and the image sensor of the optical sensor based on a gradation of a material image acquired by the image sensor.

The apparatus may further include a storage configured to store preset information including one or more of a preset brightness of light emitted by a light source of a preset optical sensor, position information of preset points, a preset slope between the preset points, a preset contour slope between the preset points, and a preset distance between a light source and an image sensor.

The processor may be further configured to adjust a brightness of the light source to correspond to a preset brightness prior to emitting the light to the material.

The processor may be further configured to detect a change in the distance between the light source and the image sensor compared to a preset distance based on the gradation of the material image, and correct the error of the distance between the light source and the image sensor based on the detected change in the distance.

The processor may be further configured to obtain a slope between preset points based on an intensity of light detected by the image sensor, and detect the change in the distance between the light source and the image sensor based on the obtained slope and a preset slope.

The processor may be further configured to obtain a first slope between X-coordinate points of the preset points and a second slope between Y-coordinate points of the preset points, and detect the change in the distance between the light source and the image sensor based on the obtained first slope and the obtained second slope.

The processor may be further configured to reset coordinates of a detection area of the image sensor with respect to the light source based on the detected change in the distance between the light source and the image sensor.

The processor may be further configured to drive another light source configured to emit light of a same wavelength as the light source, detect contour lines at positions corresponding to preset contour points from the material image, obtain a contour slope between the detected contour lines, and detect the change in the distance between the light source and the image sensor based on the obtained contour slope and a preset contour slope.

The processor may be further configured to detect a vector between the light source and the another light source, and move coordinates of a detection area of the image sensor with respect to the light source on the detected vector based on the change in the distance between the light source and the image sensor.

The apparatus may further include a display configured to display a detection area of the image sensor prior to error correction of the light source and a detection area of an image sensor reset by the processor.

According to yet another aspect of an example embodiment, there is provided an apparatus for estimating bio-information including an optical sensor including a light source and an image sensor, and a processor configured to drive the light source, correct an error of a distance between the light source and the image sensor of the optical sensor based on a gradation of a material image acquired by the image sensor, and estimate bio-information based on image data acquired with respect to an object by the image sensor of the optical sensor.

BRIEF DESCRIPTION OF THE DRAWINGS

The above and/or other aspects, features, and advantages of certain example embodiments of the disclosure will be more apparent from the following description taken in conjunction with the accompanying drawings, in which:

FIG. 6 is a flowchart illustrating a method of correcting an error according to another example embodiment;

FIGS. 7A, 7B, and 7C are diagrams for describing an example embodiment of correcting an error of an optical sensor;

DETAILED DESCRIPTION

Figure 1:
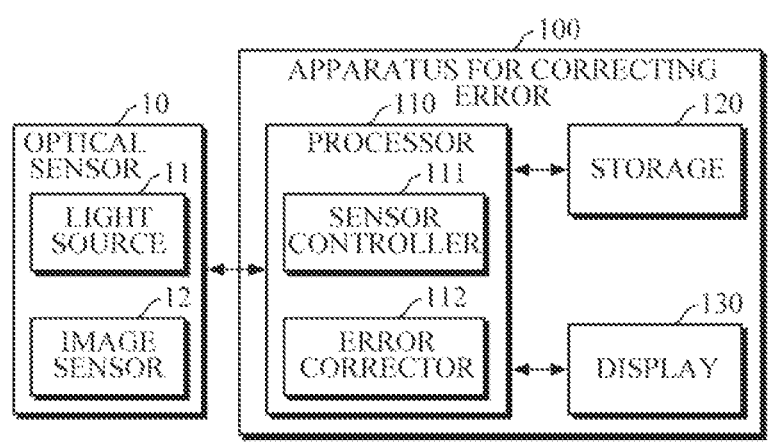
FIG. 1 is a block diagram illustrating an apparatus for correcting an error according to an example embodiment.

Details of example embodiments are provided in the following detailed description with reference to the accompanying drawings. The disclosure may be understood more readily by reference to the following detailed description of example embodiments and the accompanying drawings. The disclosure may, however, be embodied in many different forms and should not be construed as being limited to the example embodiments set forth herein. Like reference numerals refer to like elements throughout the specification and drawings. The relative size and depiction of these elements in the drawings may be exaggerated for clarity, illustration, and convenience.

It will be understood that, although the terms first, second, etc. may be used herein to describe various elements, these elements should not be limited by these terms. These terms are only used to distinguish one element from another. Also, the singular forms are intended to include the plural forms as well, unless the context clearly indicates otherwise. In the specification, unless explicitly described to the contrary, the word "comprise" and variations such as "comprises" or "comprising," will be understood to imply the inclusion of stated elements but not the exclusion of any other elements. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Terms such as "unit" and "module" denote units that process at least one function or operation, and they may be implemented by using hardware, software, or a combination of hardware and software.

Hereinafter, example embodiments of an apparatus and method for correcting an error of an optical sensor will be described in detail with reference to the drawings.

FIG. 1 is a block diagram illustrating an apparatus for correcting an error of an optical sensor according to an example embodiment.

An optical sensor 10 includes a light source 11 and an image sensor 12. The light source 11 may be configured with one or more light emitting bodies, and may include, for example, a light emitting diode (LED), a laser diode (LD), and a phosphor, but is not limited thereto. The image sensor 12, which is a device configured to detect light and convert the light into an electric signal, may include a plurality of pixels that accumulate electric charge in response to light, sense a potential change due to the accumulated electric charge, and output a signal. In this case, the image sensor 12 may be a complementary metal-oxide semiconductor (CMOS) image sensor, but is not limited thereto.

The optical sensor 10 may be mounted in devices that estimate various types of bio-information including antioxidant indicators. The light source 11 and the image sensor 12 of the optical sensor 10 may be arranged in various shapes and may have a constant preset distance between each other depending on the size of the form factor of the devices, a measurement site of an object, the type of bio-information to be analyzed, or the like. However, at the time of manufacturing the optical sensor 10, a distance between the light source 11 and the image sensor 12 may slightly deviate from a standard or preset distance, which may reduce the accuracy of a signal measured by the optical sensor 10. The apparatus 100 for correcting an error of the optical sensor 10 may correct the distance deviation between the light source 11 and the image sensor 12.

Referring to FIG. 1, the apparatus 100 for correcting an error may include a processor 110, a storage 120, and a display 130. The processor 110, the storage 120, and the display 130 of the apparatus 100 for correcting an error may be integrated into one hardware component, or may be separately implemented in two or more different hardware components.

The processor 110 may include a sensor controller 111 which is connected directly or through wireless communication to the optical sensor 10 to be corrected and configured to control the driving of the optical sensor 10, and an error corrector 112 which is configured to correct an error of the optical sensor 10 by using a signal output from the optical sensor 10.

The sensor controller 111 may drive the light source 11 of the optical sensor 10 to be corrected to emit light to a preset material. For example, the preset material may be a reflective mirror that reflects the light of the light source, or a reflector with a reflective material applied on a front surface thereof. However, the preset material is not limited thereto, and may be pure water or a solution that replicates the components of the object. In order to prevent an optical path from being changed according to the brightness of the light source 11 when the light source 11 to be corrected is driven, the sensor controller 111 may acquire preset brightness information of a preset optical sensor that corresponds to the light source 11 by referring to preset brightness information stored in the storage 120, and adjust the brightness of the light source 11 to be corrected to the preset brightness. In this case, the sensor controller 111 may output an error message through the display 130 when the brightness of the light source 11 to be corrected cannot be adjusted to the preset brightness.

When image data is generated as the light emitted by the light source 11 to be corrected is reflected by the preset material and the reflected light is detected by the image sensor 12, the error corrector 112 may receive image data from the image sensor 12 and correct an error of distance between the light source 11 and the image sensor 12 by using the received image data. For example, the error corrector 112 may use the gradation of the preset material image to compute the degree of change in the distance between the light source 11 and the image sensor 12 compared to the preset distance between the light source of the preset optical sensor and the image sensor. The error corrector 112 may reset coordinates of a detection area of the image sensor 12 with respect to the light source 11 basis on the computed degree of change in the distance between the light source 11 and the image sensor 12.

The storage 120 may store preset information necessary for error correction. For example, the preset information may include preset brightness of a light source of a preset optical sensor, position information of preset points on the image sensor of the preset optical sensor (e.g., pixel coordinates of preset points), a preset slope between preset points, a preset contour position, a preset contour slope between preset contour lines and/or a preset distance between the light source of the preset optical sensor and the image sensor, and the like. However, the preset information is not limited to the above examples.

The storage 120 may include a storage medium, such as a flash memory type, a hard disk type, a multimedia card micro type, a card type memory (e.g., a secure digital (SD) or eXtreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like, but is not limited thereto.

The display 130 may visually provide information processed by the processor 110. The display 130 may visually display the image gradation of the preset material, a position of a detection area of the image sensor 12 prior to error correction of the light source 11, and/or a position of a detection area of the image sensor 12 reset after error correction, or the coordinate axis before and after correction. The display 230 may include a display, a hologram device, or a projector, and include a touch circuitry set to sense a touch and/or a sensor circuitry set to measure a magnitude of a force generated by a touch, for example, a pressure sensor, or the like.

Hereinafter, example embodiments in which the apparatus 100 for correcting an error corrects an error of distance between the light source 11 and the image sensor 12 of the optical sensor 10 will be described with reference to FIG. 2 and other drawings.

Figure 2:
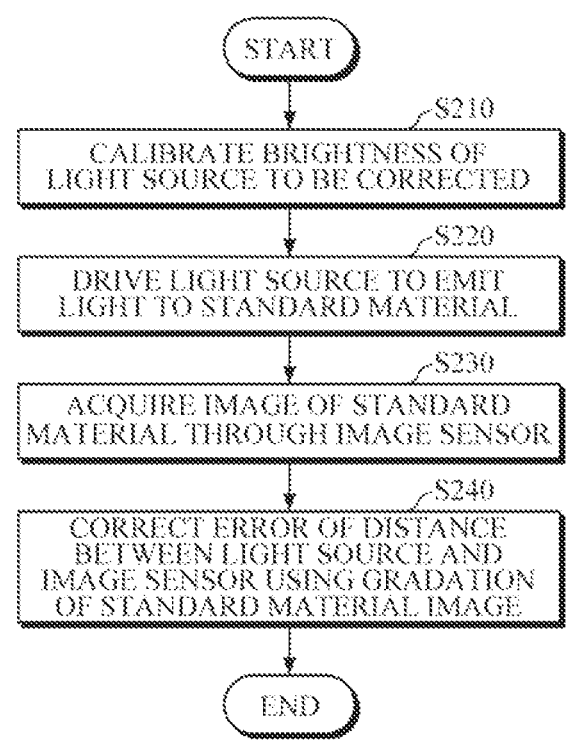
FIG. 2 is a flowchart illustrating a method of correcting an error according to an example embodiment.
Figure 3A:
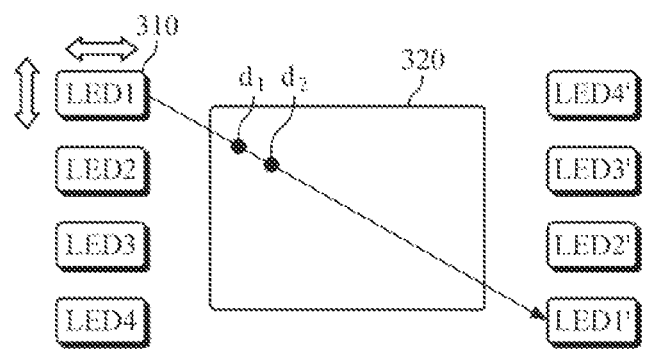
FIGS. 3A and 3B are diagrams for describing an example embodiment of correcting an error of an optical sensor.
Figure 3B:
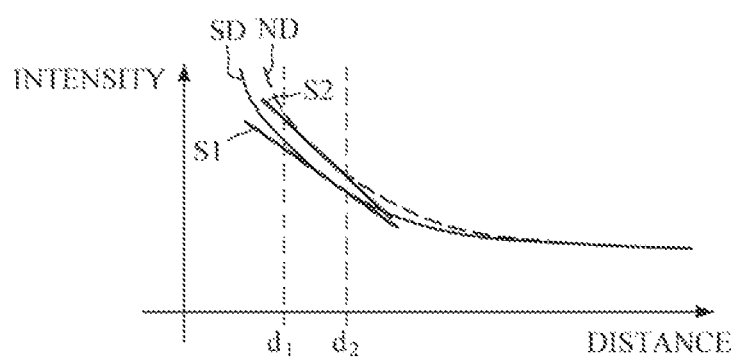

FIG. 2 is a flowchart illustrating a method of correcting an error according to an example embodiment. FIGS. 3A and 3B are diagrams for describing an example embodiment of correcting an error of an optical sensor.

Referring to FIG. 2, the sensor controller 111 may select a light source to be corrected and calibrate the brightness of the selected light source (S210).

For example, referring to FIG. 3A, an optical sensor may have an image sensor 320 disposed at the center of the optical sensor and light sources 320 arranged around the image sensor 320. The light source 310 may include a plurality of LEDs and the LEDs may be arranged around the image sensor 320 in a predetermined shape. For example, as illustrated, a plurality of LEDs (LED1, LED2, LED3, and LED4) may be disposed on one side of the image sensor 320 and a plurality of LEDs (LED1', LED2', LED3', and LED4') may be disposed on the other side of the image sensor 320. In this case, the plurality of LEDs (LED1, LED2, LED3, and LED4) disposed on one side of the image sensor 320 may each emit light of different wavelengths. In addition, the plurality of LEDs (LED1', LED2', LED3', and LED4') disposed on the other side of the image sensor 320 may emit light of different wavelengths. For example, LED1 and LED1', LED2 and LED2', LED3 and LED3', and LED4 and LED4' may emit light of the same wavelength as each other. Each LED may be disposed at a preset distance from the image sensor 320, for example, at a distance corresponding to the distance between the LED of the preset optical sensor and the image sensor. However, the distance may be slightly different from the preset distance due to various factors in manufacturing.

The sensor controller 111 may select an LED to be corrected, for example, LED1, in order to correct an error due to a slight change in distance between the light source 310 and the image sensor 320, and adjust the brightness of the selected LED1 to the preset brightness of LED1 of the preset optical sensor in a state where the selected LED1 is set to have the same optical path as the LED1 of the preset optical sensor.

Then, the selected light source 310 is driven to emit light to the preset material (S220), and an image of the preset material is obtained through the image sensor (S230). Then, the error of distance between the light source and the image sensor may be corrected using a gradation of the preset material image (S240). Image data of the preset material obtained by the image sensor 320 may include, for example, data on the intensity of light received by each pixel of the image sensor 320, and the intensity of light of each pixel may be represented as a gradation of the preset material image.

As described above, when the optical sensor is manufactured, a slight change in the position of the LED 310 is a factor that causes a change in the gradation of the preset material image obtained by the image sensor 320. For example, as shown in FIGS. 3A and 3B, a slope S1 and S2 between two points d1 and d2 of the image sensor is different between the preset optical sensor SD and the optical sensor ND to be corrected.

Therefore, the error corrector 112 may calculate a slope between preset points on the image sensor 320 which are designated for each LED of the light source 310, and detect a change in distance between the light source and the image sensor by comparing the calculated slope with a preset slope between the preset points of the preset optical sensor. Equation (1) below is an example of an equation for calculating a change in distance between a light source and an image sensor using a slope between preset points and a calculated slope.

$$G_{L1} = \frac{I(d_1) - I(d_2)}{d_1 - d_2}$$

$$G'_{L1} = \frac{I(d'_1) - I(d'_2)}{d'_1 - d'_2}$$

$$d'_1 = d_1 + \Delta$$

$$d'_2 = d_2 + \Delta$$

$$\Delta = \frac{1}{\mu} \ln\left(\frac{G}{G1}\right)$$

Equation (1)

Here, d1 and d2 denote preset distances from a light source of a preset optical sensor to preset points of an image sensor, for example, pixel coordinates (x1, y1) and (x2, y2). The preset points may be set for each LED of the light source. d'1 and d'2 denote distances from a light source of an optical sensor to be corrected to preset points of an image sensor, for example, pixel coordinates (x1,y1) and (x2,y2). For example, a preset point position is the same pixel position on the image sensor of the preset optical sensor and on the image sensor of the optical sensor to be corrected, and a distance from a position of an LED to each preset point is changed according to the change in the position of the LED. GL1 and G'L1 denote slopes between preset points of the preset optical sensor and between preset points of the optical sensor to be corrected, respectively. I(d1) and I(d2) each denote an intensity of light received at a preset point position of the preset optical sensor or an absorbance at the preset point position, and I(d'1) and I(d'2) each denote an intensity of light received at a preset point position of the optical sensor to be corrected or an absorbance at the preset point position. µ denotes an absorption coefficient pre-acquired for a preset material. Here, the absorbance may be obtained by the Lambert-Beer's law.

The error corrector 112 may sequentially calculate a change Δ in distance between each LED and the image sensor for all LEDs of the light source of the optical sensor to be corrected compared to the preset optical sensor, and adjust a detection area of the image sensor for each LED. For example, the coordinate axis of the image sensor may be reset by being moved by a distance corresponding to the distance change Δ, or the detection area set in the image sensor for each LED may be moved.

Figure 4:
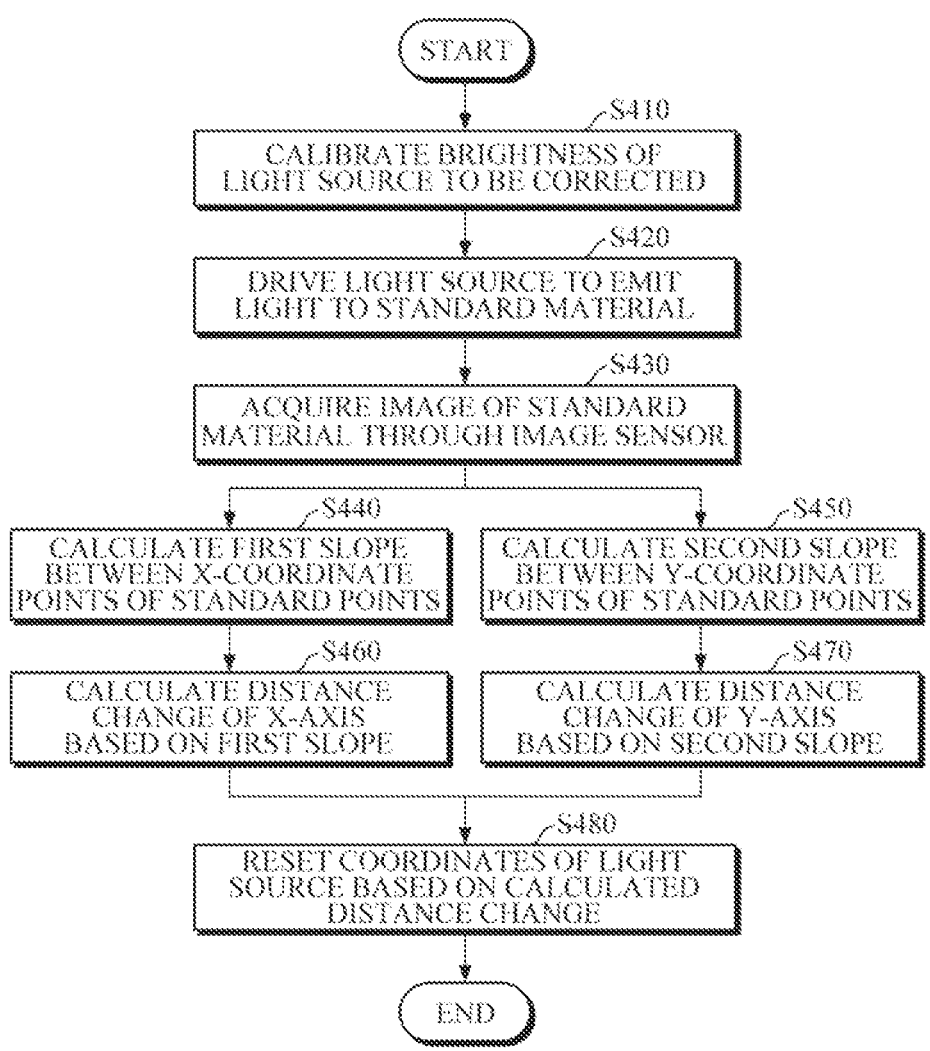
FIG. 4 is a flowchart illustrating a method of correcting an error according to another example embodiment.
Figure 5A:
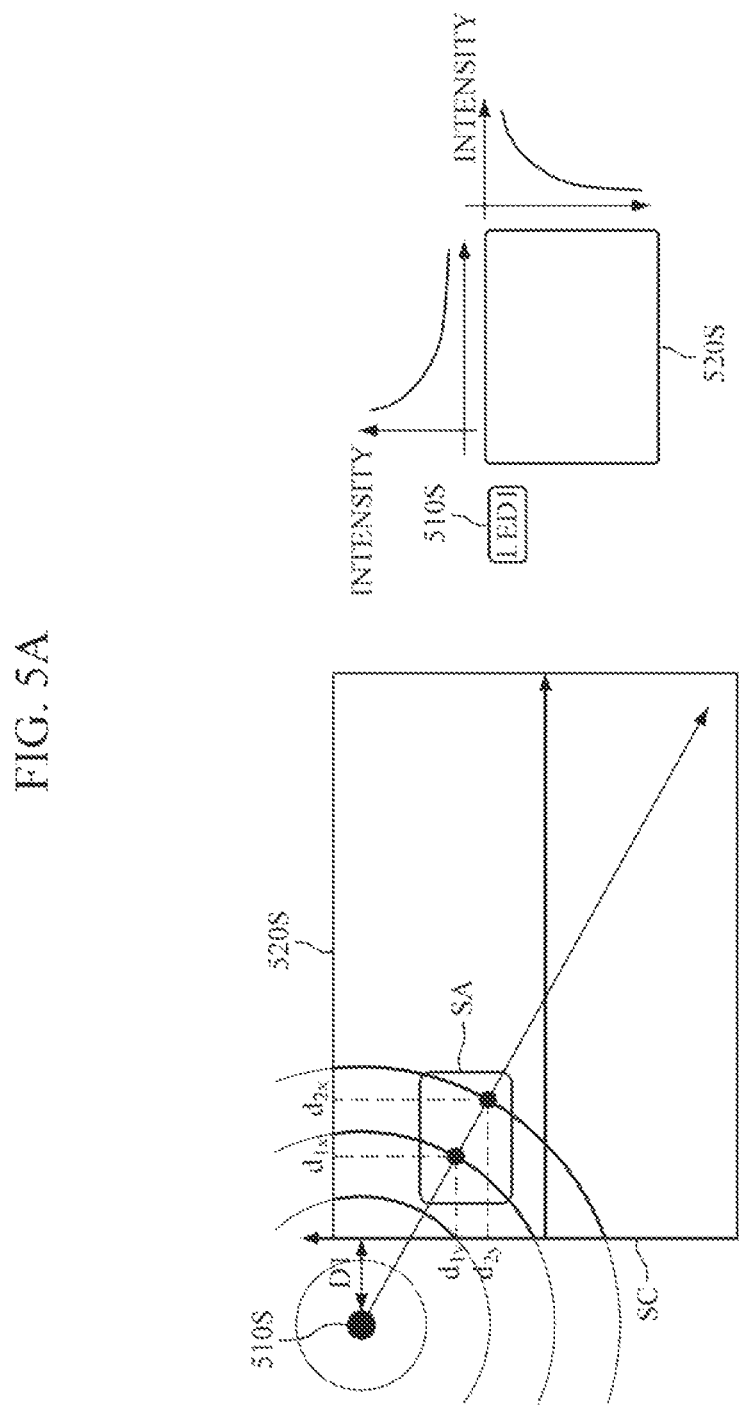
FIGS. 5A, 5B, and 5C are diagrams for describing an example embodiment of correcting an error of an optical sensor.
Figure 5B:
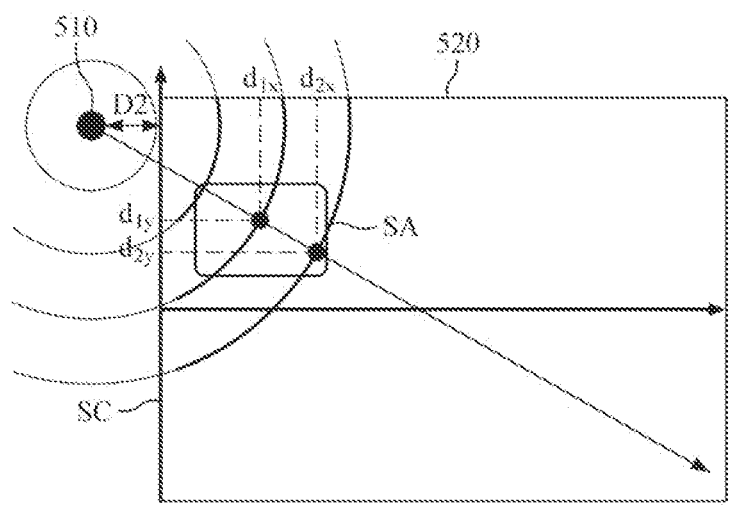
Figure 5C:
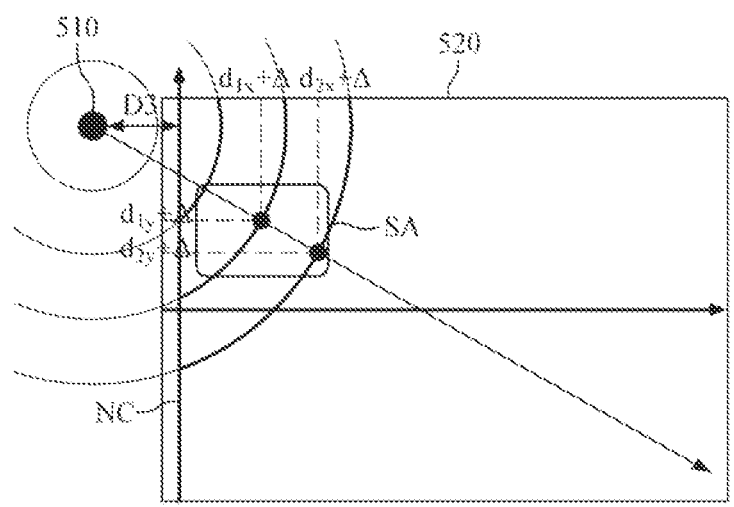

FIG. 4 is a flowchart illustrating a method of correcting an error according to another example embodiment. FIGS. 5A to 5C are diagrams for describing an example embodiment of correcting an error of an optical sensor.

Referring to FIG. 4, the sensor controller 111 may adjust the brightness of a light source to be corrected to a preset brightness of a light source of a preset optical sensor (S410), and the light source is driven to emit light to a preset material (S420). Then, an image of the preset material may be obtained by an image sensor (S430).

Then, the error corrector 112 may calculate a first slope between X-coordinate points of preset points using a gradation of the preset material image (S440), and calculate a second slope between Y-coordinate points of the preset points (S450).

FIG. 5A illustrates the preset optical sensor, in which LED1 510S of the preset optical sensor is disposed apart from a coordinate axis SC of an image sensor 520S by a preset distance D1. FIG. 5B illustrates the optical sensor to be corrected, in which LED1 510 is further shifted toward the image sensor 520 compared to the preset optical sensor and is disposed apart by a distance D2. As shown in FIG. 5A, assuming that a preset detection area SA for the LED 510S of the preset optical sensor is set around the preset point positions (d1x, d1y) and (d2x, d2y), the preset detection area SA must also be shifted as the position of the LED 510 of the optical sensor to be corrected is shifted, in order to measure a constant signal from the same preset material through the same LED1.

In this way, in order to appropriately shift the detection area SA of the image sensor for each light source according to the change in the position of the light source, the error corrector 112 may individually calculate the first slope on the X-axis and the second slope on the Y axis through Equation (1) described above based on, respectively, the change in the light intensity of the X-coordinate points d1x and d2x at the preset point positions and the change in the light intensity of the Y-coordinate points d1y and d2y at the preset point positions.

Then, the error corrector 112 may separately calculate the distance change of the X-axis and the distance change of the Y-axis through Equation 1 above by using the first slope and the second slope individually calculated for the X- and Y-axes (S460 and S470).

Then, the coordinate axis may be reset based on the distance change of the X-axis and the distance change of the Y-axis (S480). FIG. 5C illustrates that a coordinate axis NC is reset with respect to LED1 510 to be corrected, wherein the new coordinate axis NC may be reset so that a distance between the LED1 510 to be corrected and the new coordinate axis of the image sensor 520 is the same as a preset distance D1 or becomes a distance D3 within a predetermined threshold.

Figure 7B:
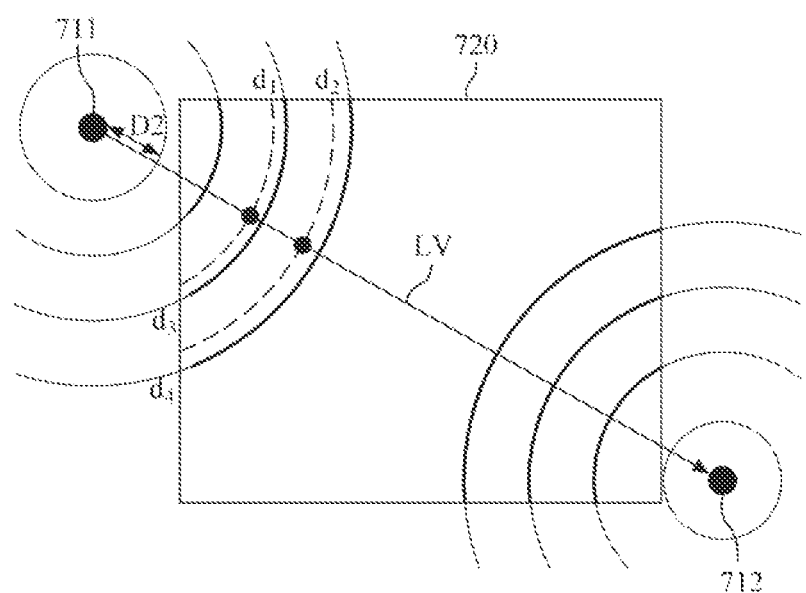
Figure 7C:
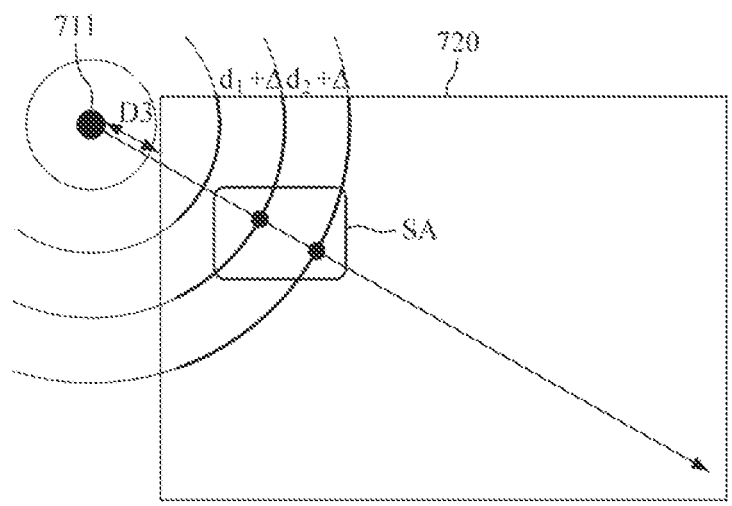

FIG. 6 is a flowchart illustrating a method of correcting an error according to another example embodiment. FIGS. 7A to 7C are diagrams for describing an example embodiment of correcting an error of an optical sensor.

Referring to FIG. 6, the sensor controller 111 may adjust a brightness of a first light source to be corrected to the preset brightness of the light source of the preset optical sensor (S610), and emit light to the preset material by driving the first light source (S620). In this case, the sensor controller 111 may simultaneously drive the first light source to be corrected and a second light source. Here, the second light source may be disposed at a position facing the first light source with respect to the image sensor. Also, the second light source may emit light of the same wavelength as the first light source.

Then, the image sensor acquires an image of the preset material (S630), and the error corrector 112 may detect a vector between the first light source and the second light source (S640). In this case, the vector may be detected based on the arrangement positions of the first light source and the second light source.

Then, contour lines at positions corresponding to preset point contour positions may be detected from the preset material image acquired in operation S630 (S650). For example, FIG. 7A illustrates that a first LED 711S of the preset optical sensor and a second LED 712S positioned opposite to the first LED 711S across an image sensor 720S are driven. In this way, by driving the light sources 711S and 712S positioned opposite to each other, contour lines can be more clearly generated on the image. Referring to FIG. 7A, preset contour lines d1 and d2 at the time when the first LED 711S of the preset optical sensor is apart from a coordinate axis of an image sensor 720 by a preset distance D1, and a preset contour slope between the preset contour lines d1 and d2 may be preset. FIG. 7B illustrates that a first LED 711 of an optical sensor to be corrected is shifted toward the image sensor 720 compared to the preset optical sensor and is apart from the image sensor 720 by a distance D2. The error corrector 112 may detect the contour lines (d1 and d2 of FIG. 7B) at positions corresponding to the preset contour lines (d1 and d2 of FIG. 7a) from the preset material image acquired in operation S630.

Then, a contour slope between the detected contour lines (d1 and d2 of FIG. 7B) may be calculated (S650). For example, a slope between intersections between the contour lines (d1 and d2 of FIG. 7B) and the vector detected in operation S640 may be calculated as the contour slope through Equation (1). However, the example embodiment is not limited thereto, and various known methods of detecting contour lines from an image and detecting a slope between contour lines may be used.

Then, a change in the distance between the light source and the image sensor may be detected based on the calculated contour slope (S670). For example, a distance change may be detected by comparing the preset contour slope between the preset contour lines calculated through the preset optical sensor and the contour slope calculated in operation S650.

Then, a detection area or the coordinate axis may be moved in a direction of the vector detected in operation S640 based on the calculated distance change (S680). FIG. 7C illustrates that a detection area SA for the first LED 711 is moved.

Figure 8:
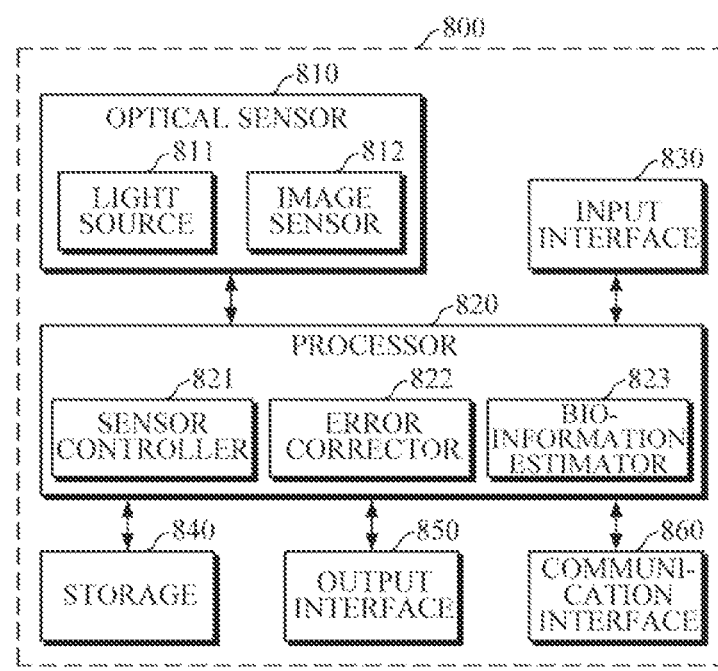
FIG. 8 is a block diagram illustrating an apparatus for estimating bio-information according to an example embodiment.

FIG. 8 is a block diagram illustrating an apparatus for estimating bio-information according to an example embodiment.

Referring to FIG. 8, an apparatus 800 for estimating bio-information may include an optical sensor 810, a processor 820, an input interface 830, a storage 840, an output interface 850, and a communication interface 860. Each component may be integrated into one hardware component, or may be distributed on two or more physically separate hardware components.

The optical sensor 810 may include a light source 811 and an image sensor 812. When light is scattered or reflected by an object irradiated by light emitted from the light source 811, the optical sensor 810 may detect the scattered or reflected light through the image sensor 812 and acquire spectrum data of the light or a bio-signal, such as a pulse wave signal. The light source 811 may include one or more light emitting bodies, such as LEDs, LDs, or the like, and each light emitting body may be configured to have a different wavelength. The image sensor 812 may be a CMOS image sensor including a plurality of pixels.

The processor 820 may include a sensor controller 821, an error corrector 822, and a bio-information estimator 823. The processor 820 may be divided into two or more processors, and one processor may be implemented as the sensor controller 821 and the error corrector 822 to perform a function of correcting an error of the optical sensor 810 and the other processor may be implemented as the bio-information estimator 823.

The processor 820 may be connected to each of the optical sensor 810, the input interface 830, the storage 840, the output interface 850, and the communication interface 860 of the apparatus 800 to estimate bio-information, generate a control command to control each component, and transmit the control command to each component. The processor 820 may also receive data from each component and process the received data. The processed data may also be transmitted to other components so that necessary operations can be performed by the other components.

The sensor controller 821 may control the optical sensor 810 to acquire image data from a preset material or an object. For example, when the light source 811 of the optical sensor 810 is driven, the sensor controller 821 may adjust a brightness of the light source 811 to a preset brightness by referring to a light source driving condition stored in the storage. In this case, when the brightness of the light source 811 is not adjusted to the preset brightness, an error message regarding the light source 811 may be output through the output interface.

The error corrector 822 may correct an error of the optical sensor 810 using a gradation of the preset material image acquired from the preset material as described above. The sensor controller 821 and the error corrector 822 may operate when a request from a manufacturer is received at the time of manufacturing the apparatus 800 for estimating bio-information.

When a bio-information estimation request is received from a user, the bio-information estimator 823 may control the optical sensor 810 through the sensor controller 821 to acquire wavelength-specific absorbance data from an object, and estimate bio-information using the wavelength-specific absorbance data. In this case, the bio-information may include carotenoid, blood glucose, urea, uric acid, lactate, triglyceride, calorie, protein, cholesterol, moisture, chromophore, ethanol, blood pressure, vascular age, arterial stiffness, aortic pressure waveform, blood vessel elasticity, stress index, a degree of fatigue, skin age, and skin elasticity, but is not limited thereto.

For example, the bio-information estimator 823 may estimate bio-information based on the wavelength-specific absorbance data by using a predefined bio-information estimation model. Here, the bio-information estimation model may define the correlation between the wavelength-specific absorbance and the bio-information, and may be pre-generated through training using wavelength-specific absorbance and estimated bio-information values acquired from a plurality of users. The bio-information estimation model may be generated as a linear or non-linear function equation using machine learning, a neural network, artificial intelligence, or the like.

The input interface 830 may receive a command and/or data to be used in each component, for example, the processor 820, of the apparatus 800 for estimating bio-information from the user or an external device. The input interface 830 may include a microphone, a mouse, a keyboard, a touch screen, and/or a digital pen (stylus pen, etc.), but is not limited thereto.

The storage 840 may store preset information for correction of an error of the optical sensor 810, error correction information of the optical sensor 810 (e.g., reset coordinate information for each light source, brightness of each light source, and the like), preset information for bio-information estimation, for example, user characteristic information, such as a health condition, gender, age, or the like of the user, the bio-information estimation model, and the like. Also, the storage 840 may store data generated and/or processed by various components of the apparatus 800 for estimating bio-information. As described above, the storage 840 may include a storage medium, such as a flash memory type, a hard disk type, a multimedia card micro type, a card type memory (e.g., a SD or XD memory), a RAM, a SRAM, a ROM, an EEPROM, a PROM, a magnetic memory, a magnetic disk, an optical disk, and the like, but is not limited thereto.

The output interface 850 may externally output the data generated or processed by various components of the apparatus 800 for estimating bio-information. For example, the output interface 850 may include an acoustic output device to externally output an acoustic signal. An acoustic output module may include a speaker and/or a receiver. Also, the output interface 850 may include a display device to visually provide data. The display device may include a display, a hologram device, or a projector. The display device may include a touch circuitry set to sense a touch and/or a sensor circuitry (pressure sensor, etc.) set to measure a magnitude of a force generated by a touch. Also, the output interface 850 may include a haptic module to output data through tactile sensation or vibration. The haptic module may convert an electrical signal into a mechanical stimulation (vibration, motion, etc.) or an electrical stimulation that the user is able to recognize through a tactile sensation or kinesthetic sensation. The haptic module may include a motor, a piezoelectric element, and/or an electrical stimulation device.

The communication interface 860 may communicate with an external device to transmit the data generated and/or processed by each component of the apparatus 800 for estimating bio-information to the external device, and may receive data to be used in the apparatus 800 for estimating bio-information from the external device. The external device may include an information processing device, such as a smartphone, a tablet personal computer (PC), a desktop computer, a laptop computer, or the like. The communication interface may communicate with the external device by using various wired or wireless communication techniques including Bluetooth communication, Bluetooth low energy (BLE) communication, near field communication (NFC), wireless local access network (WLAN) communication, ZigBee communication, infrared data association (IrDA) communication, Wi-Fi Direct (WFD) communication, ultra-wideband (UWB) communication, Ant+ communication, Wi-Fi communication, radio frequency identification (RFID) communication, 3G communication, 4G communication, and/or 5G communication. However, the communication techniques are not limited thereto.

Figure 9:
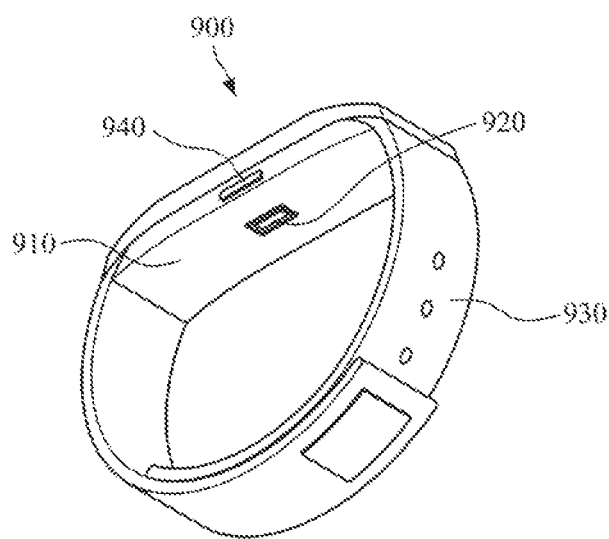
FIG. 9 is a diagram illustrating a wearable device including an apparatus for estimating bio-information according to an example embodiment.

FIG. 9 is a diagram illustrating a wearable device including an apparatus for estimating bio-information according to an example embodiment. FIG. 9 illustrates, as an example of the apparatus 800 of FIG. 8, a wearable device 900 in the form of a smartwatch that a user can wear.

The wearable device 900 includes a main body 910 and a strap 930. The main body 910 may be worn with the strap 930 around a user's wrist. The main body 910 may include the apparatus 800 of the wearable device 900 for estimating bio-information and configurations to perform other functions. A battery may be embedded in the main body or the strap 930 to supply power to the wearable device. The strap 930 may be made of a flexible material to conform to a user's wrist. The strap 930 may include a first strap and a second strap that are separate from each other. Each of one ends of the first strap and the second strap may be connected to each of the both ends of the main body 910, and the first strap and the second strap may be fastened to each other via fastening means. In this case, the fastening means may be formed as a magnet fastening means, a Velcro fastening means, a pin fastening means, but is not limited thereto. In addition, the strap 930 may be formed as an integrated piece, such as a band.

An optical sensor 920 may be mounted on one surface of the main body 910, and a processor disposed in the main body 910 may be electrically connected to the optical sensor 920. The processor may estimate bio-information using absorbance data acquired from an object through the optical sensor 920.

Also, the main body 910 may include a storage to store data generated and/or processed by the wearable device 900 and a communication interface to transmit and received data to and from an external device.

A manipulator 940 may be mounted on one side of the main body 910 to receive a control command of the user and transmit the received control command to the processor. The manipulator 940 may include a power button to input a command to turn on/off the wearable device 900. Also, a display may be mounted on the front surface of the main body 910, and the display may include a touch screen enabling touch input. The display may receive a touch input of the user, transmit the received touch input to the processor, and display a processing result of the processor.

Figure 10:
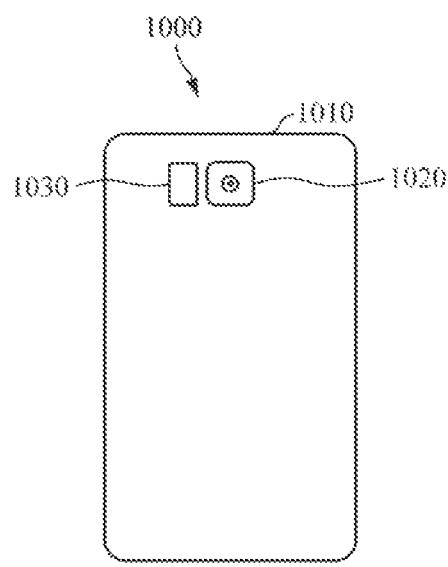
FIG. 10 is a diagram illustrating a smart device including an apparatus for estimating bio-information according to an example embodiment.

FIG. 10 is a diagram illustrating a smart device including an apparatus for estimating bio-information according to an example embodiment. FIG. 10 illustrates, as an example of the apparatus 800 of FIG. 8, a mobile device that can be carried by a user.

The mobile device 1000 may have an optical sensor 1030 mounted on a rear surface of a main body 1010. The optical sensor 1030 may include a light source and an image sensor. A processor is disposed inside the main body 1010 of the mobile device 1000, and the processor may be electrically connected to the optical sensor 1030 and estimate bio-information using data received from the optical sensor 1030.

A camera module 1020 may be disposed on the rear surface of the main body 1010 of the mobile device 1000. The camera module 1020 may capture a still image or record a video. The camera module 1020 may include a lens assembly including one or more lenses, image sensors, image signal processors and/or flashes.

A display may be mounted on the front surface of the main body 1010 of the mobile device 1000. The display may visually output various data generated and/or processed in the mobile device 1000 and may include a touch screen to receive a touch input.

The example embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

Example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents.

While example embodiments have been described with reference to the figures, it will be understood by one of ordinary skill in the art that various changes in form and details may be made therein without departing from the spirit and scope as defined by the following claims.

What is claimed is:

1. A method of correcting an error of an optical sensor comprising a light source and an image sensor, the method comprising:
    emitting light to a material by driving the light source;
    acquiring an image of the material by the image sensor;
    detecting a change in a distance between the light source and the image sensor from a preset distance based on a gradation of the image of the acquired image of the material; and
    correcting an error of the distance between the light source and the image sensor of the optical sensor based on the gradation of the acquired image of the material and the detected change in the distance.

2. The method of claim 1, wherein the emitting of the light comprises adjusting a brightness of the light emitted by the light source to correspond to a preset brightness prior to emitting the light from the light source.

3. The method of claim 1, wherein the correcting of the error comprises:
    obtaining a slope between preset points based on an intensity of light detected by the image sensor; and
    detecting the change in the distance between the light source and the image sensor based on the obtained slope and a preset slope.

4. The method of claim 3, wherein the correcting of the error comprises:
    obtaining a first slope between X-coordinate points of the preset points of the image sensor and a second slope between Y-coordinate points of the preset points of the image sensor; and
    detecting the change in the distance between the light source and the image sensor based on the obtained first slope and the obtained second slope.

5. The method of claim 1, wherein the correcting of the error comprises resetting coordinates of a detection area of the image sensor with respect to the light source based on the detected change in the distance between the light source and the image sensor.

6. The method of claim 1, wherein the emitting of the light comprises driving another light source configured to emit light of a same wavelength as the light source, and
    wherein the correcting of the error further comprises:
        detecting contour lines at positions corresponding to preset contour points from the image of the material;
        obtaining a contour slope between the detected contour lines; and
        detecting the change in the distance between the light source and the image sensor based on the obtained contour slope and a preset contour slope.

7. The method of claim 6, wherein the correcting of the error further comprises
    detecting a vector between the light source and the other light source; and
    moving coordinates of a detection area of the image sensor with respect to the light source on the detected vector based on the change in the distance between the light source and the image sensor.

8. The method of claim 1, further comprising displaying a detection area of the image sensor prior to error correction of the light source and a detection area of an error-corrected image sensor.

9. An apparatus configured to correct an error of an optical sensor comprising a light source and an image sensor, the apparatus comprising:
    a processor configured to:
        drive the light source to emit light to a material; and
        detect a change in a distance between the light source and the image sensor compared to a preset distance based on a gradation of a material image acquired by the image sensor;
        correct an error of the distance between the light source and the image sensor of the optical sensor based on the gradation of the material image acquired by the image sensor and the detected change in the distance.

10. The apparatus of claim 9, further comprising a storage configured to store information including one or more of a preset brightness of light emitted by a light source of a preset optical sensor, position information of preset points, a preset slope between the preset points, a preset contour slope between the preset points, and a preset distance between a light source and an image sensor.

11. The apparatus of claim 9, wherein the processor is further configured to adjust a brightness of the light source to correspond to a preset brightness prior to emitting the light to the material.

12. The apparatus of claim 9, wherein the processor is further configured to:
    obtain a slope between preset points based on an intensity of light detected by the image sensor; and
    detect the change in the distance between the light source and the image sensor based on the obtained slope and a preset slope.

13. The apparatus of claim 12, wherein the processor is further configured to:
    obtain a first slope between X-coordinate points of the preset points and a second slope between Y-coordinate points of the preset points; and
    detect the change in the distance between the light source and the image sensor based on the obtained first slope and the obtained second slope.

14. The apparatus of claim 9, wherein the processor is further configured to reset coordinates of a detection area of the image sensor with respect to the light source based on the detected change in the distance between the light source and the image sensor.

15. The apparatus of claim 9, wherein the processor is further configured to:
- drive another light source configured to emit light of a same wavelength as the light source;
- detect contour lines at positions corresponding to preset contour points from the material image;
- obtain a contour slope between the detected contour lines; and
- detect the change in the distance between the light source and the image sensor based on the obtained contour slope and a preset contour slope.

16. The apparatus of claim 15, wherein the processor is further configured to:
- detect a vector between the light source and the other light source; and
- move coordinates of a detection area of the image sensor with respect to the light source on the detected vector based on the change in the distance between the light source and the image sensor.

17. The apparatus of claim 9, further comprising a display configured to display a detection area of the image sensor prior to error correction of the light source and a detection area of an image sensor reset by the processor.

18. An apparatus for estimating bio-information comprising:
- an optical sensor comprising a light source and an image sensor; and
- a processor configured to:
  - drive the light source;
  - detect a change in a distance between the light source and the image sensor compared to a preset distance based on a gradation of a material image acquired by the image sensor;
  - correct an error of the distance between the light source and the image sensor of the optical sensor based on the gradation of the material image acquired by the image sensor and the detected change in the distance; and
  - estimate bio-information based on image data acquired with respect to an object by the image sensor of the optical sensor.

* * * * *